US009774436B2

(12) United States Patent
Jeon et al.

(10) Patent No.: US 9,774,436 B2
(45) Date of Patent: Sep. 26, 2017

(54) SYSTEMS, METHODS AND DEVICES FOR SELECTIVE INTERFERENCE COORDINATION IN A CELLULAR PROTOCOL

(71) Applicant: Intel IP Corporation, Santa Clara, CA (US)

(72) Inventors: Jeongho Jeon, San Jose, CA (US); Huaning Niu, Milpitas, CA (US); Apostolos Papathanassiou, San Jose, CA (US); Pingping Zong, Randolph, NJ (US); Mo-Han Fong, Sunnyvale, CA (US); Jong-Kae Fwu, Sunnyvale, CA (US); Christian Ibars Casas, Santa Clara, CA (US); Geng Wu, Santa Clara, CA (US); Qinghua Li, San Ramon, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 223 days.

(21) Appl. No.: 14/498,679

(22) Filed: Sep. 26, 2014

(65) Prior Publication Data
US 2015/0215100 A1 Jul. 30, 2015

Related U.S. Application Data

(60) Provisional application No. 61/933,856, filed on Jan. 30, 2014.

(51) Int. Cl.
*H04L 5/00* (2006.01)
*H04L 5/14* (2006.01)
(Continued)

(52) U.S. Cl.
CPC ....... *H04L 5/0062* (2013.01); *H04W 74/0816* (2013.01); *H04L 5/0032* (2013.01)

(58) Field of Classification Search
CPC ....... H04L 5/0062; H04L 5/14; H04L 5/0032; H04W 72/005; H04W 72/0453; H04W 72/02; H04W 24/08; H04W 84/12
See application file for complete search history.

(56) References Cited

U.S. PATENT DOCUMENTS 6,577,613 B1 * 6/2003 Ramanathan ......... H04W 28/26
370/337
7,953,412 B2 * 5/2011 Lee ..................... H04L 12/5695
455/436

(Continued)

FOREIGN PATENT DOCUMENTS

| WO | 2011008032 A2 | 1/2011 |
| WO | 2013022254 A2 | 2/2013 |
| WO | 2013077600 A1 | 5/2013 |

OTHER PUBLICATIONS

Almeida, et al., "Enabling LTE/WiFi coexistence by LTE blank subframe allocation", IEEE ICC 2013—Wireless Communications Symposium, 2013, pp. 5083-5088.

(Continued)

*Primary Examiner* — Rasheed Gidado
(74) *Attorney, Agent, or Firm* — Stoel Rives LLP

(57) ABSTRACT

A user equipment (UE) can reserve shared spectrum between two wireless protocols upon the request from a tower. For example, an enhanced node B (eNB or eNodeB) transmits a message to associated UEs including a set of candidate UEs, a length of time to reserve, and a frequency band to use. UEs perform medium sensing on the specified spectrum if a UE finds its identifier in the set of candidate UEs. Candidate UEs transmit a clear to send (CTS) message with channel reservation information if the medium is idle. A result of the success or failure of the CTS transmission attempt is sent back to the eNB. Upon receiving the feedback information from the UEs, the eNB starts sending data (Continued)

to those UEs that sent the positive feedback on the channel reservation.

21 Claims, 9 Drawing Sheets

(51) Int. Cl.
    *H04W 72/02*     (2009.01)
    *H04W 24/08*     (2009.01)
    *H04W 72/00*     (2009.01)
    *H04W 72/04*     (2009.01)
    *H04W 74/08*     (2009.01)

(56) References Cited

U.S. PATENT DOCUMENTS

| | | | | |
|---|---|---|---|---|
| 8,102,822 B2 * | 1/2012 | Qin | ............... | H04W 74/04 370/337 |
| 8,400,960 B2 * | 3/2013 | Hiertz | ............... | H04W 74/02 370/328 |
| 8,730,905 B2 * | 5/2014 | Kneckt | ............... | H04W 72/0406 370/330 |
| 9,144,087 B2 * | 9/2015 | Eriksson | ............... | H04W 72/1289 |
| 2010/0091716 A1 | 4/2010 | Bonta et al. | | |
| 2010/0093360 A1 * | 4/2010 | Choi | ............... | H04W 48/12 455/450 |
| 2012/0198024 A1 * | 8/2012 | Ishikawa | ............... | H04N 7/17318 709/217 |
| 2013/0155931 A1 * | 6/2013 | Prajapati | ............... | H04W 72/044 370/311 |
| 2014/0342745 A1 * | 11/2014 | Bhushan | ............... | H04W 72/082 455/450 |
| 2015/0063148 A1 * | 3/2015 | Sadek | ............... | H04W 28/26 370/252 |

OTHER PUBLICATIONS

PCT/US2015/013473, International Search Report and Written Opinion, May 22, 2015, 14 pages.

ETRI, "Unicast, groupcast/broadcast, and relay for public safety D2D communications", R1-133181, 3GPP TSG-RAN1 Meeting #74, Barcelona, Spain, Agenda Item 7.2.8.1, Aug. 19-23, 2013, 11 pages.

Huawei, Hisilicon, "Difficulties to implement CSMA-like MAC in D2D communication", R2-133155, 3GPP TSG RAN WG2 Meeting #83BIS, Ljubljana, Slovenia, Agenda Item 7.5.2.1, Oct. 7-11, 2013, 5 pages.

Ratasuk, et al., "License-Exempt LTE Deployment in Heterogeneous Network", IEEE Wireless Communication Systems (ISWCS) 2012 International Symposium, 2012, pp. 246-250.

* cited by examiner

Illustration of the Channel Reservation Procedure: CTS TX Command

Illustration of the Data Transmission: Data Transmission

US 9,774,436 B2

SYSTEMS, METHODS AND DEVICES FOR SELECTIVE INTERFERENCE COORDINATION IN A CELLULAR PROTOCOL

RELATED APPLICATION

This application claims the benefit under 35 U.S.C. §119(e) of U.S. Provisional Application No. 61/933,856 filed Jan. 30, 2014, which is incorporated by reference herein in its entirety.

TECHNICAL FIELD

The present disclosure relates to interference coordination in an unlicensed spectrum and more specifically relates to interoperation of a cellular protocol with other wireless protocols.

DETAILED DESCRIPTION OF PREFERRED EMBODIMENTS

Figure 1:
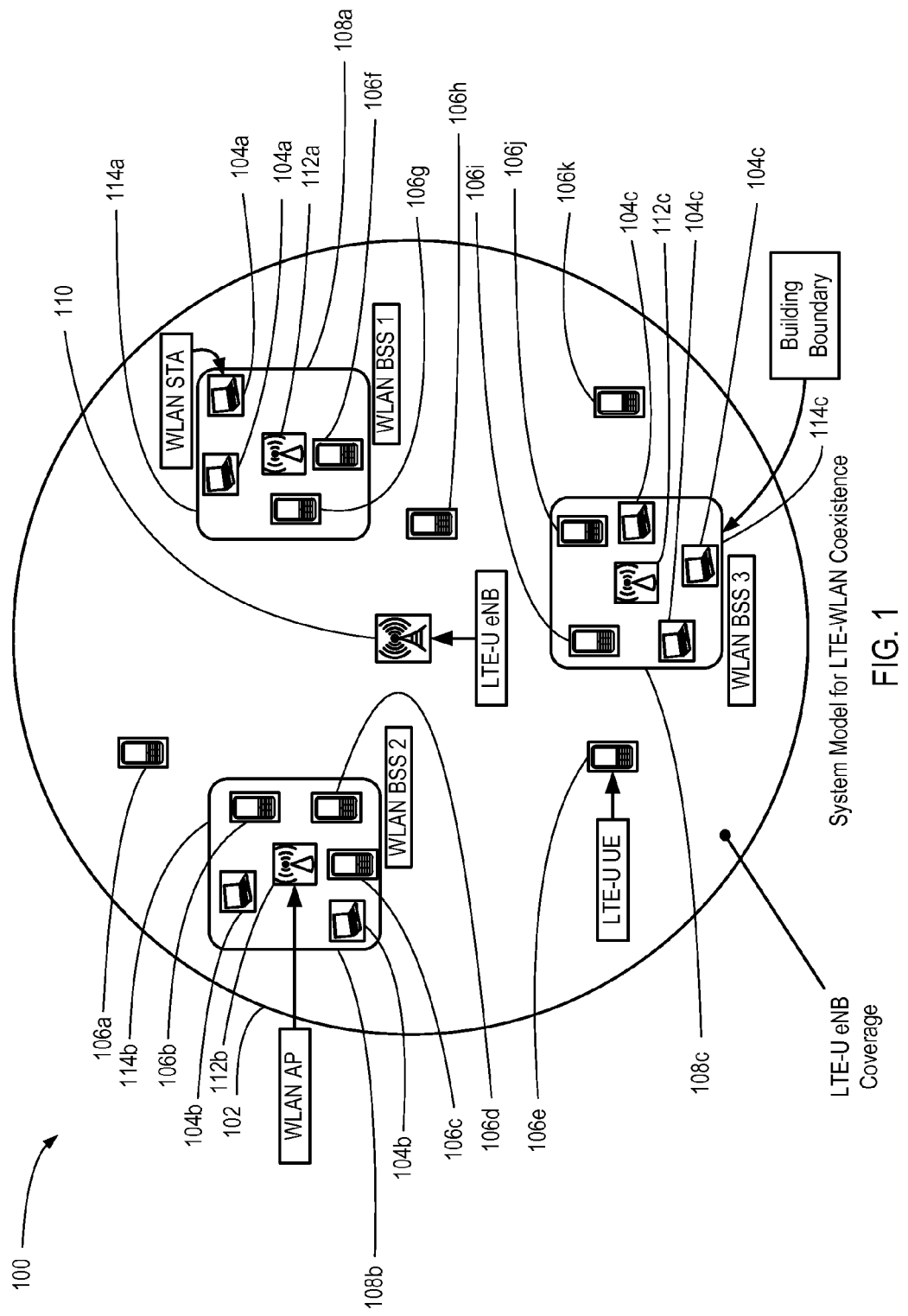
FIG. 1 is a schematic diagram illustrating a system for interference coordination consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable reservation of shared spectrum between two wireless protocols. For example, a UE can reserve shared spectrum between two wireless protocols upon a request from a tower. For example, an enhanced node B (eNB or eNodeB) that includes a network controller transmits a message to associated UEs including a set of candidate UEs, a length of the time to reserve, and a frequency band to use. In some embodiments, such a message can be broadcasted from the eNB to the UEs through a dedicated control channel (which can be over licensed or unlicensed spectrum). If a UE finds its identifier in the set of candidate UEs, the UE performs medium sensing (e.g. clear channel assessment (CCA), etc.) on the specified spectrum (i.e., a shared communication channel) using a wireless interface. If the medium is idle, candidate UEs transmit a clear to send (CTS) message with channel reservation information. A result of the success or failure of the CTS transmission attempt is sent back to the eNB. Upon receiving the feedback information from the UEs, the eNB starts sending data to those UEs that sent the positive feedback on the channel reservation. The connection between eNB can be downlink only (simplex) or uplink and downlink capable (duplex).

By allowing a UE to medium sense and send CTS (rather than an eNB), an indoor reception problem can be satisfied. For example, a WLAN basic service set (BSS) is located indoors and an eNB is located outdoors. UEs associated with the eNB can be either indoor or outdoor. An eNB would have difficulty detecting many of the indoor transmissions. In the example, an indoor AP transmits at 20 dBm power. While a specific I-to-O penetration model could be determined, a simpler O-to-I model for I-to-O can be used by assuming symmetry. Under the urban microcell non-line of sight (UMi-NLOS) model, din=10 m and dout=0 m already gives signal power that falls below −82 dBm (where din is the indoor distance from the AP to the building wall, dout is the outdoor distance from the building wall to the eNB, and −82 dBm is the threshold for detecting valid orthogonal frequency-division multiplexing (OFDM) signals by WLAN stations (STAs)). In the case of a UMi-LOS model, the signal strength falls below −82 dBm starting from dout=25 m with din=10 m. At these ranges, it would be difficult for an eNB to sense nearby ongoing indoor WLAN transmissions. If a scheduled UE is also in the same indoor space, then a long term evolution (LTE) transmission can fail due to the strong interference from the nearby WLAN STA.

Sending a CTS message by an eNB can have a problem medium sensing for indoor UEs and failed transmissions to indoor UEs. This indoor WLAN and outdoor eNB scenario can be seen in the environment. In fact, 80% of UEs are indoor under some LTE small cell simulation settings. In some embodiments, LTE in an unlicensed band (LTE-U) focuses on downlink transmission, and interference at the receiver (i.e., UE) can be viewed as having a higher importance compared with interference at the transmitter (i.e., the eNB).

It should be recognized that LTE in an unlicensed band (LTE-U) is also referred to as Licensed Assisted Access (LAA) using LTE herein. Where LTE-U is mentioned, LAA can also be considered.

In addition, a traditional RTS/CTS exchange can also suffer issues. Similar to the eNB sending CTS messages described above, an eNB can fail to sense ongoing indoor WLAN transmissions when it sends an RTS message. An exchange of RTS/CTS between an eNB and a UE using WLAN radio access technology can use more power. A traditional RTS/CTS exchange can cause UEs to have an active WLAN transceiver to monitor unlicensed spectrum, even though it may not be served over the unlicensed spectrum. Exchange of RTS/CTS is focused on a point-to-point transmission between an eNB and a UE, but actual resource allocation in an LTE system involves multiple resource blocks in each subframe. These resource blocks can be used to serve multiple UEs. Using an RTS/CTS exchange can cause an eNB to reestablish the communication link by exchanging RTS/CTS with UEs selected for transmissions.

By allowing a UE to medium sense and send a CTS message, the UEs to be served by an eNB locally freeze WLAN STAs (interferers) and confine the actual data transmissions to those UEs that succeeded in reserving a channel by sending the CTS message (instead of unnecessarily freezing too many WLAN STAs around the eNB, if the CTS message were sent by the eNB). Many UEs are already equipped with a WLAN transceiver and therefore are equipped to send a CTS message. By sending a CTS by a UE at a lower transmit power, localized channel reservations around the UE are enabled, which is the downlink receiver. Other WLAN STAs outside a range of a UE can be unaffected because, due to their distance from a UE, they are not directly interfering with an LTE downlink transmission.

There is an increasing demand for high data rates to service a variety of applications over licensed wireless, but usable electromagnetic spectrum is limited to licensed frequency bands. However, unlicensed spectrum can be used by third-generation partnership project (3GPP) LTE service providers to increase wireless data capacity by widening the operating frequency band to include unlicensed spectrum.

Unlicensed spectrum can be, however, already occupied by incumbent radio access technologies (RATs) such as the IEEE 802.11-based WLAN systems. Frequency reuse by different radio technologies can cause interference and reduce communication reliability. Frequency reuse by LTE-U can be unfavorable for WLAN systems given that LTE-U can be used for supplementary downlink operation and eNB transmission power can be several tens of times higher than transmission power of many WLAN devices.

Various approaches can be used to reduce coexistence interference between different RATs, including interference avoidance and interference coordination. For example, dynamic frequency selection (DFS) to enable radios to choose the frequency band with the least interference is an example of an interference avoidance scheme. However, it should be noted that DFS may not be required by regulatory domains in some unlicensed spectrum, such as the frequency band from 5.725 GHz to 5.825 GHz.

FIG. 1 is a schematic diagram illustrating a system 100 for interference coordination consistent with embodiments disclosed herein. eNB 110 with coverage area 102 uses an LTE-U protocol to communicate with UEs 106a, 106b, 106c, 106d, 106e, 106f, 106g, 106h, 106i, 106j and 106k. WLAN access points (APs) 112a, 112b and 112c can be placed in buildings 114a, 114b and 114c. WLAN APs 112a, 112b and 112c can provide network connectivity to WLAN stations (STAs) 104a, 104b and 104c. In some embodiments, WLAN APs 112a, 112b and 112c also provide network connectivity to one or more of UEs 106a, 106b, 106c, 106d, 106e, 106f, 106g, 106h, 106i, 106j and 106k.

eNB 110 communicates with UEs 106a, 106b, 106c, 106d, 106e, 106f, 106g, 106h, 106i, 106j and 106k inside and outside buildings 114a, 114b and 114c. UEs 106a, 106e, 106i and 106k are located outside buildings. UEs 106g and 106f are within building 108a, which includes WLAN service by AP 112a. UEs 106b, 106c and 106d are within building 108b, which includes WLAN service by AP 112b. UEs 106i and 106j are within building 108c, which includes WLAN service by AP 112c.

In some embodiments, eNB 110 can send control information over licensed bands (e.g., universal mobile telecommunications system frequency bands (UTMS), etc.) while sending data over unlicensed bands (e.g., LTE-U). In some embodiments, eNB 110 can send both control information and data over unlicensed bands.

Figure 2:
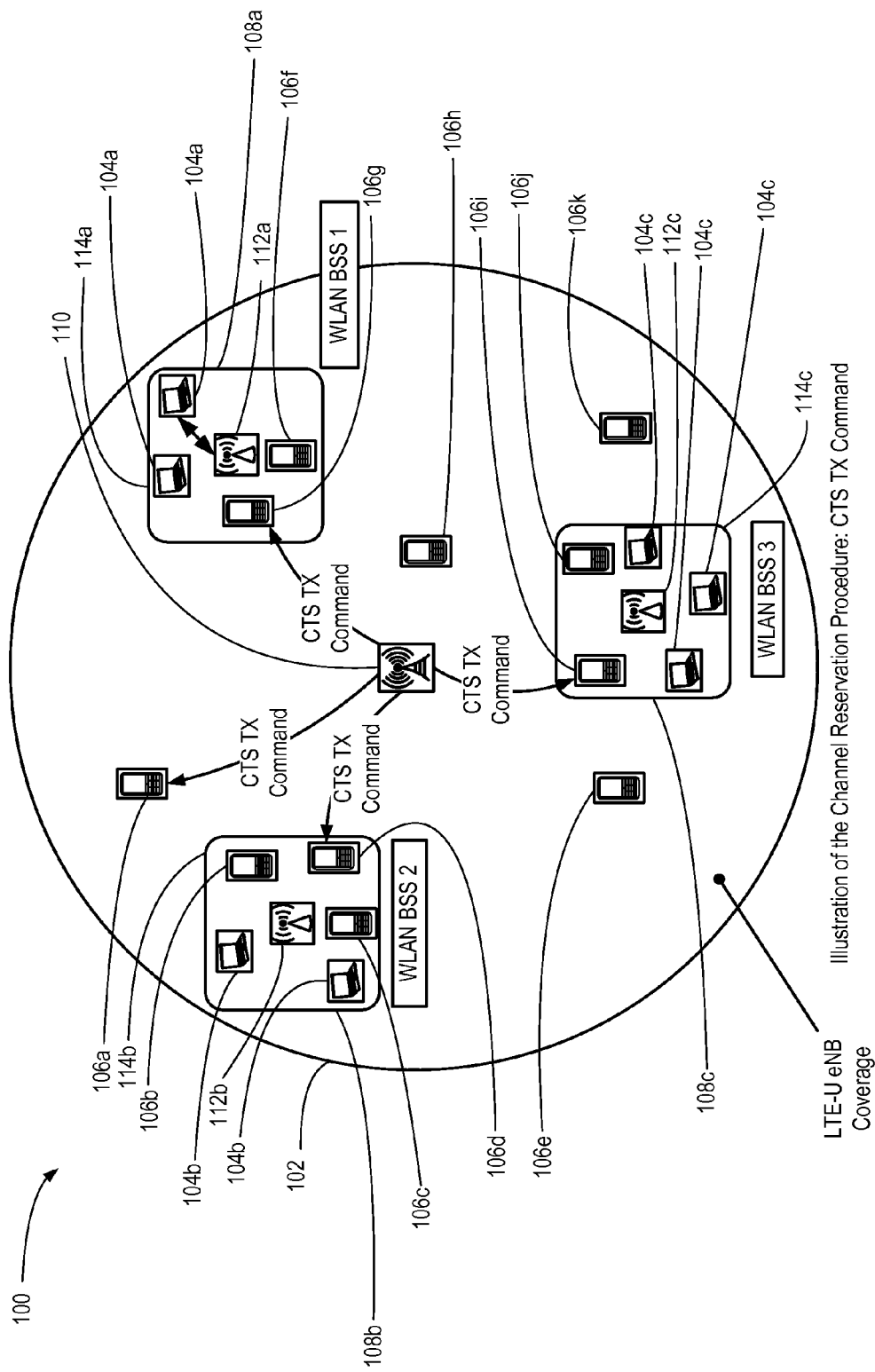
FIG. 2 is a schematic diagram illustrating a system with a cellular tower requesting a user equipment (UE) to reserve spectrum consistent with embodiments disclosed herein.
Figure 3:
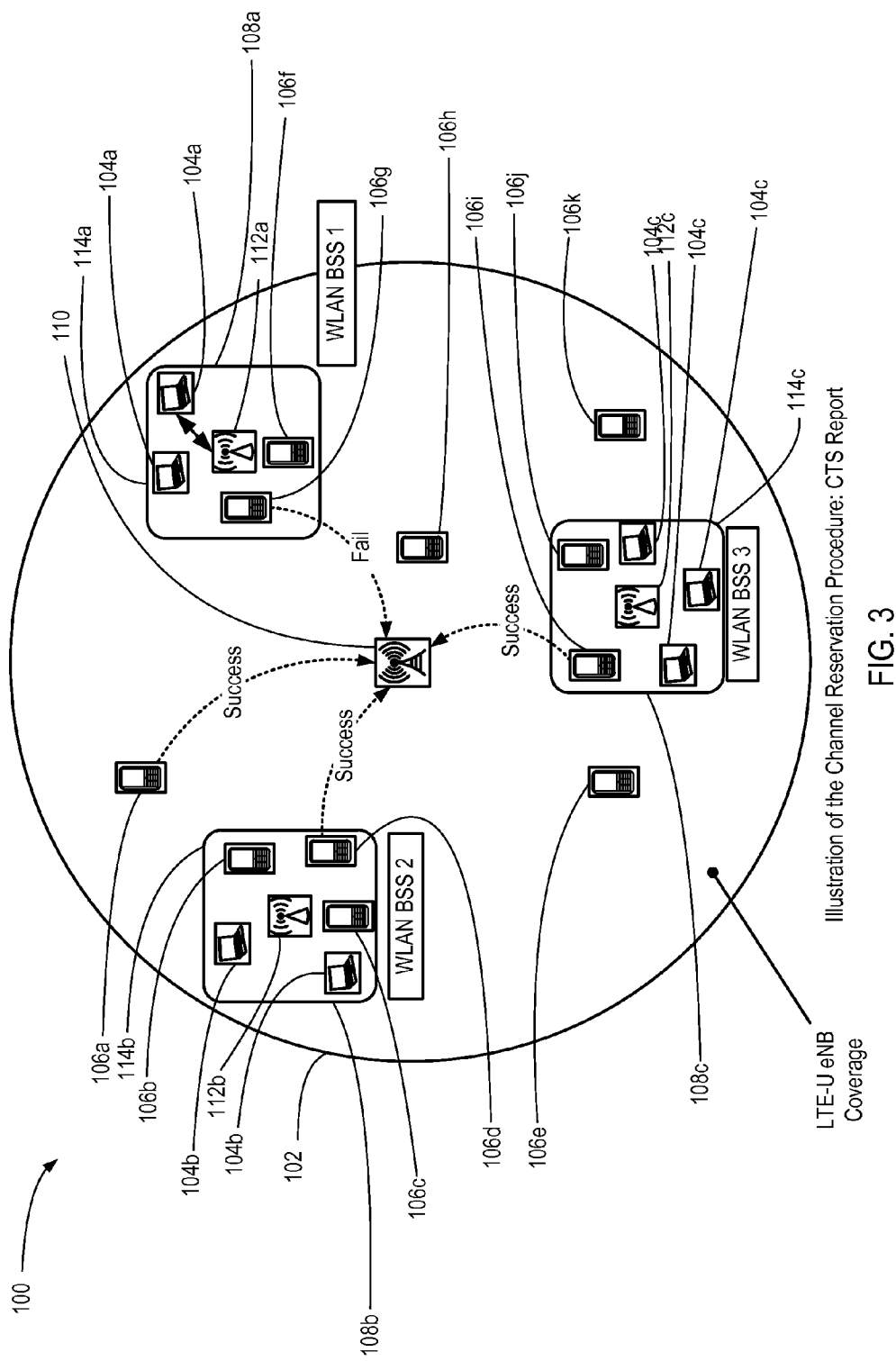
FIG. 3 is a schematic diagram illustrating a system with a UE reporting results of spectrum reservation consistent with embodiments disclosed herein.
Figure 4:
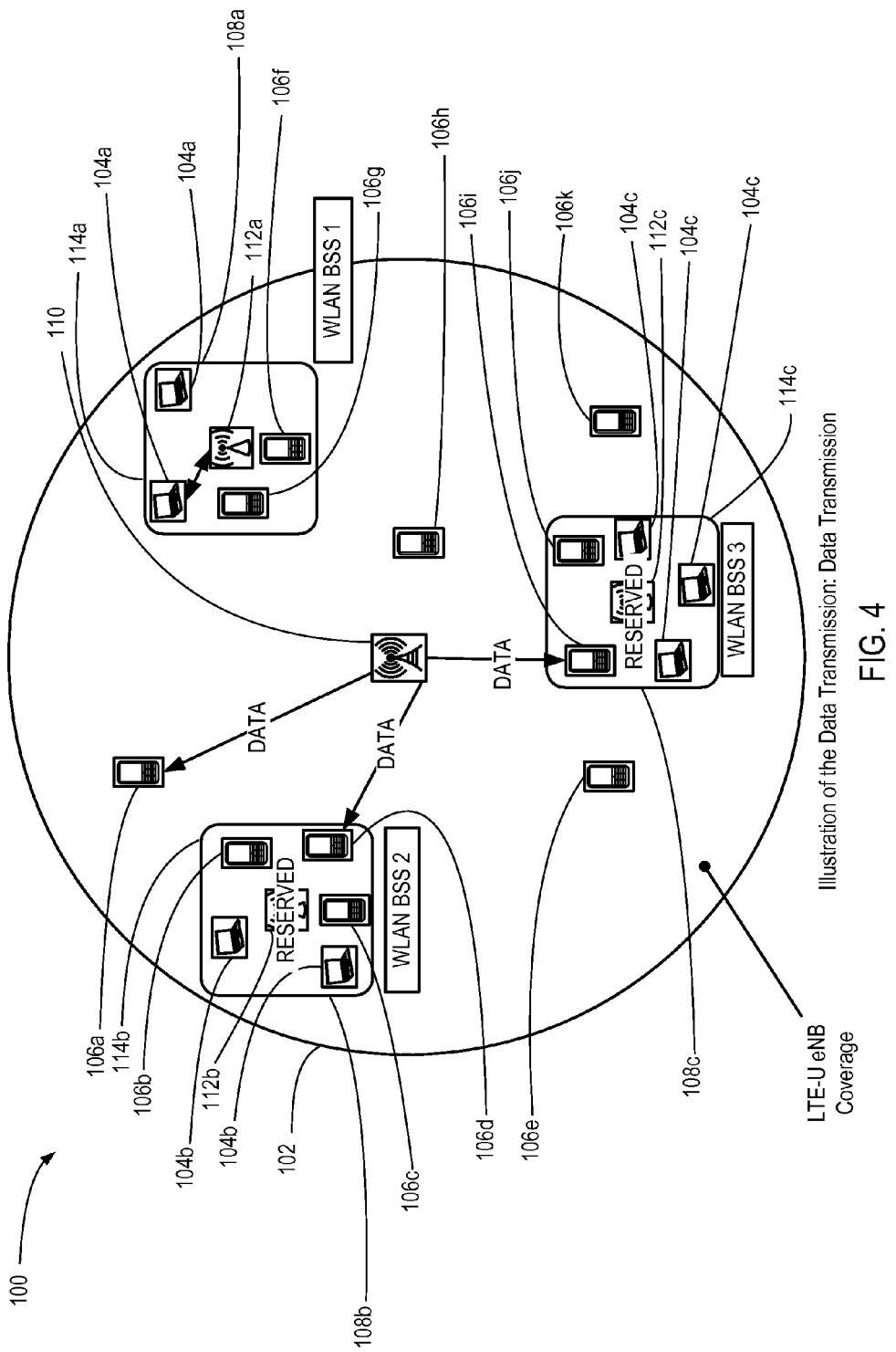
FIG. 4 is a schematic diagram illustrating a system with a cellular tower sending data to a UE that successfully reserved spectrum consistent with embodiments disclosed herein.

FIGS. 2-4 show an example of how the system 100 of FIG. 1 can be used to coordinate transmissions over a cellular protocol (e.g., 3GPP LTE) with a WLAN protocol (e.g., IEEE 802.11 protocols, Wi-Fi, etc.). FIG. 2 shows eNB 110 sending a message to selected UEs 106a, 106d, 106g and 106i that indicate selected UEs 106a, 106d, 106g and 106i to broadcast a reservation message (e.g., CTS message) to local WLAN devices. UEs 106a, 106d, 106g and 106i, in response to the message from eNB 110, sense the medium (e.g., frequency bands) for WLAN traffic. If the medium is clear, UEs 106a, 106d, 106g and 106i transmit a reservation message using a WLAN protocol (e.g., CTS message). FIG. 3 shows UEs 106a, 106d, 106g and 106i transmitting a success or failure message to eNB 110 that reports whether UEs 106a, 106d, 106g and 106i were able to transmit the reservation message. UEs 106a, 106d and 106i were successful. UE 106g was not successful. FIG. 4 shows eNB 110 sending data to UEs 106a, 106d and 106i that were successfully able to reserve the medium. eNB can buffer messages that were unable to be sent for transmission at a later time.

FIG. 2 is a schematic diagram illustrating system 100 of FIG. 1 with eNB 110 requesting UEs 106a, 106d, 106g and 106i to reserve spectrum consistent with embodiments disclosed herein. eNB 110 sends a message to selected UEs 106a, 106d, 106g and 106i that indicate selected UEs 106a, 106d, 106g and 106i to broadcast a reservation message (e.g., CTS message) to local WLAN devices.

In the embodiment shown, each round of the LTE transmission over the unlicensed spectrum is initiated by eNB 110. eNB 110 determines a subset of UEs 106a, 106d, 106g and 106i from the set of UEs 106a, 106b, 106c, 106d, 106e, 106f, 106g, 106h, 106i, 106j and 106k that should be serviced. eNB 110 starts by transmitting a message to the associated UEs 106a, 106d, 106g and 106i, including but not limited to the information about the subset of candidate UEs 106a, 106d, 106g and 106i that eNB 110 wants to serve, the length of time that it wants to reserve from the WLAN STAs 104a, 104b and 104c, and the frequency band that it will use.

UEs 106a, 106d, 106g and 106i, in response to the message from eNB 110, sense the medium (e.g., frequency bands) for WLAN traffic. If the medium is clear, the UEs 106a, 106d, 106g and 106i transmit a reservation message using a WLAN protocol (e.g., CTS message).

For example, such a message can be sent to UEs 106a, 106d, 106g and 106i using broadcast channel or dedicated control channel (over licensed or unlicensed spectrum). When eNB 110 determines the set of candidate UEs 106a, 106d, 106g and 106i, it may take into account the downlink queue backlog waiting for transmission to each of UEs 106a, 106d, 106g and 106i and the location information of UEs 106a, 106d, 106g and 106i. The transmission of the broadcast message by eNB 110 to the candidate subset of UEs 106a, 106d, 106g and 106i is illustrated in FIG. 2, which is denoted as CTS TX Command.

FIG. 3 is a schematic diagram illustrating system 100 of FIG. 1 with UEs reporting results of spectrum reservation consistent with embodiments disclosed herein. After UEs 106a, 106d, 106g and 106i attempt to send a reservation message, UEs 106a, 106d, 106g and 106i transmit a success or failure message to eNB 110 that reports whether UEs 106a, 106d, 106g and 106i were able to transmit the reservation message. UEs 106a, 106d and 106i were successful. UE 106g was not successful. As a result, APs 112b and 112c are silenced during times reserved by the reservation message. AP 112b was silenced by a reservation message by UE 106c. AP 112c was silenced by a reservation message by UE 106i.

In the embodiment shown, UEs 106a, 106d, 106g and 106i perform medium sensing on the specified spectrum if it finds its ID in the set of candidate UEs 106a, 106d, 106g and 106i in the message from eNB 110. Unselected UEs 106b, 106c, 106e, 106f, 106h, 106j and 106k that are not in the candidate set do not perform sensing and save energy from unnecessary channel probing. If one of UEs 106a, 106d, 106g and 106i in the candidate set sees the medium busy, then it does not transmit CTS. Thus, only UEs 106a, 106d and 106i that are in the candidate set and sense the medium idle will transmit the CTS message. After that, as shown in FIG. 3, UEs 106a, 106d, 106g and 106i in the candidate set send the feedback message back to eNB 110 on the success/fail of its CTS transmission attempt. This is shown by "Success" and "Fail" arrows in FIG. 3.

In some embodiments, if a UE senses medium idle, there is a possibility that the CTS transmission may not be successful if there is another close-by UE transmitting CTS at the same time. This possibility can be precluded by eNB 110 when selecting the candidate UE set by taking into account the location information of other candidate UEs. Introducing random timing offsets before transmitting CTS by each UE could be another alternative. More specifically, each UE senses medium idle delays its CTS transmission for a small random amount of time to reduce the chances that more than one UE transmits CTS at the same time. By doing so, a UE observing a CTS transmission by another UE can abort its CTS transmission. Simultaneous CTS transmissions may not result in a mutual collision since control messages such as CTS are usually protected with a robust coding and transmitted at the lowest rate.

FIG. 4 is a schematic diagram illustrating system 100 of FIG. 1 with eNB 110 sending data to UEs 106a, 106d and 106i that successfully reserved spectrum. After receipt of success and failure messages, eNB 110 determines that successful UEs 106a, 106d and 106i receive data. APs 112b and 112c are silenced during times reserved by successful reservation messages by UEs 106d and 106i (represented by a "RESERVED" overlay on top of APs 112b and 112c). eNB 110 transmits data for successful UEs 106a, 106d and 106i using LTE-U over unlicensed spectrum.

Upon receiving the feedback information from UEs 106a, 106d, 106g and 106i, eNB 110 starts sending data to UEs 106a, 106d and 106i that were successful on reserving the medium (e.g., APs 112b and 112c and neighboring WLAN STAs 104a, 104b and 104c) as illustrated in FIG. 4. This approach allows reservation of spectrum locally around the UEs 106a, 106d and 106i that are actually served by eNB 110, while allowing the spectrum to be used by WLAN STAs 104a that do not directly interfere with the LTE downlink transmission such as WLAN BSS 1 in FIG. 4.

Figure 5:
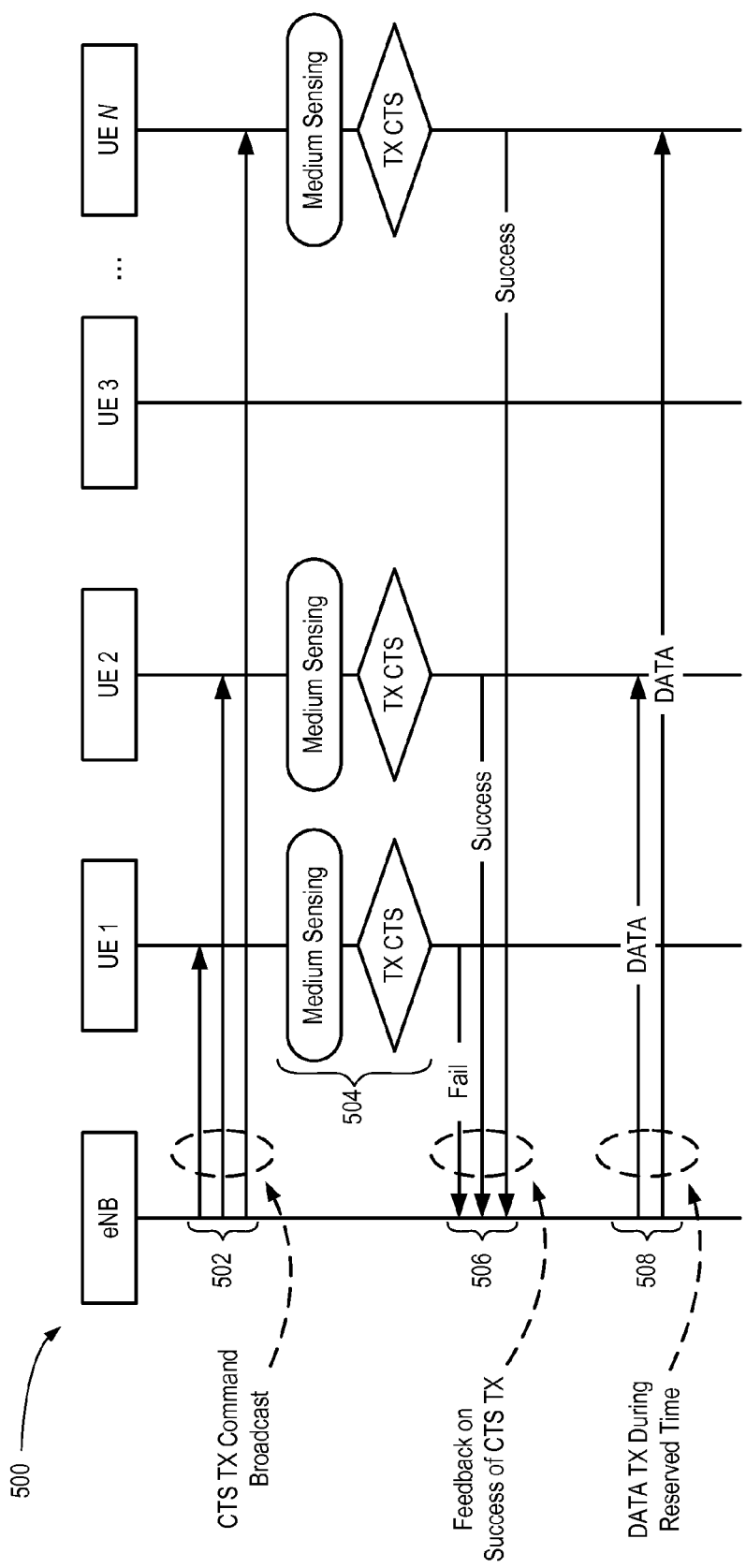
FIG. 5 is flow diagram illustrating a process for reserving unlicensed spectrum consistent with embodiments disclosed herein.

FIG. 5 is flow diagram illustrating a process 500 for reserving unlicensed spectrum consistent with embodiments disclosed herein. Process 500 can be accomplished by system 100 as shown in FIG. 1, including eNB 110; UEs 106a, 106b, 106c, 106d, 106e, 106f, 106g, 106h, 106i, 106j and 106k; WLAN APs 112a, 112b and 112c; and WLAN STAs 104a, 104b and 104c. In the embodiment shown, eNB 110 selects UE 1, UE 2 and UE 4 for communication. UE 3 is not selected. UE 1 fails to reserve the medium. UE 2 and UE 4 successfully reserve the medium and receive data from eNB 110.

For example and in operation 502, eNB 110 sends a message to selected UEs (UEs that are selected to receive or send data) that request selected UEs to broadcast a reservation message to local WLAN devices. eNB 110 sends the message to UE 1, UE 2 and UE 4. UE 3 does not receive a message and can transition into a low power state during the next LTE-U transmission. In operation 504, UEs, in response to the message from eNB 110, sense the medium (e.g., frequency bands) for WLAN traffic. If the medium is clear in operation 504, UEs 106a, 106d, 106g and 106i transmit a reservation message using a WLAN protocol (e.g., CTS message). UE 2 and UE 4 were successful in sensing a clear medium and transmitting a reservation message (TX CTS). UE 1 sensed a busy medium and did not transmit a reservation message. In operation 506, UE 1 sends a failure message to eNB 110. In operation 506, UE 2 and UE 4 send success messages to eNB 110. In operation 508, eNB 110 sends data to successful UE 2 and UE 4 that reserved the medium.

Figure 6:
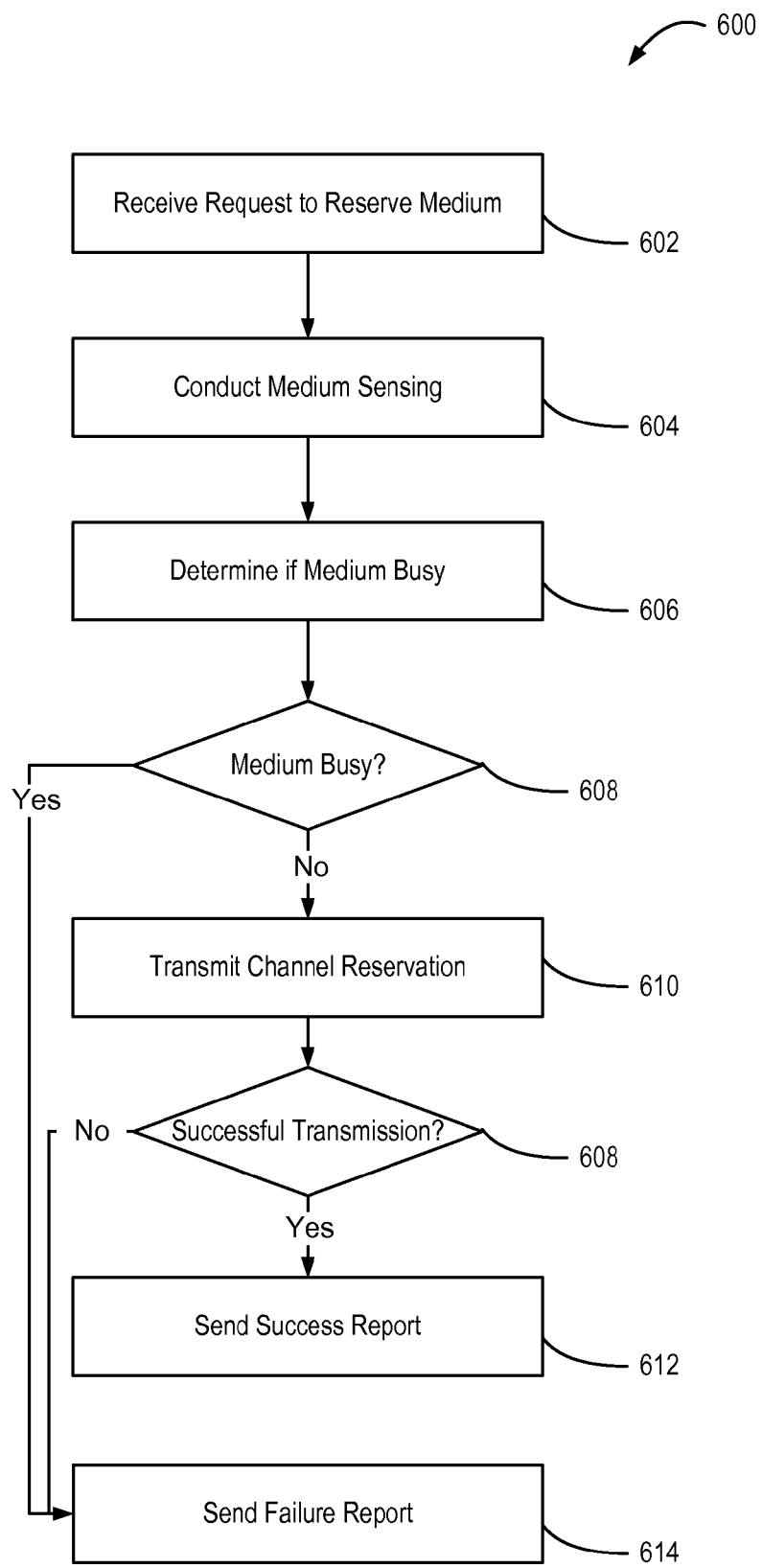
FIG. 6 is an example of a method for reserving spectrum from a UE perspective consistent with embodiments disclosed herein.

FIG. 6 is an example of a method 600 for reserving spectrum from a UE perspective. Process 600 can be accomplished by system 100 as shown in FIG. 1, including eNB 110; UEs 106a, 106b, 106c, 106d, 106e, 106f, 106g, 106h, 106i, 106j and 106k; WLAN APs 112a, 112b and 112c; and WLAN STAs 104a, 104b and 104c. In block 602, the UE receives a request to reserve the medium (e.g., unlicensed spectrum used by WLAN). In block 604, the UE conducts medium sensing to determine in block 606 whether the medium is busy (e.g., existing transmissions). If the medium is busy in block 608, the UE sends a failure report to eNB 110 in block 614. If the medium is available in block 608, the UE transmits a channel reservation using a WLAN protocol (e.g., CTS). If the channel reservation was successfully transmitted in block 608, the UE sends a success report to eNB 110 in block 612. In some embodiments, block 608 can be omitted and a success report 612 can be sent before, after or during block 610. In this embodiment, if the medium is idle, the UE can assume that a channel reservation is successfully sent. After block 612, eNB 110 can send data using LTE-U to UE.

In some embodiments, a control channel can be used over a licensed band (e.g., LTE), while data can be sent over an unlicensed band (e.g., LTE-U). This can allow for simultaneous transmission and/or receipt of messages.

Figure 7:
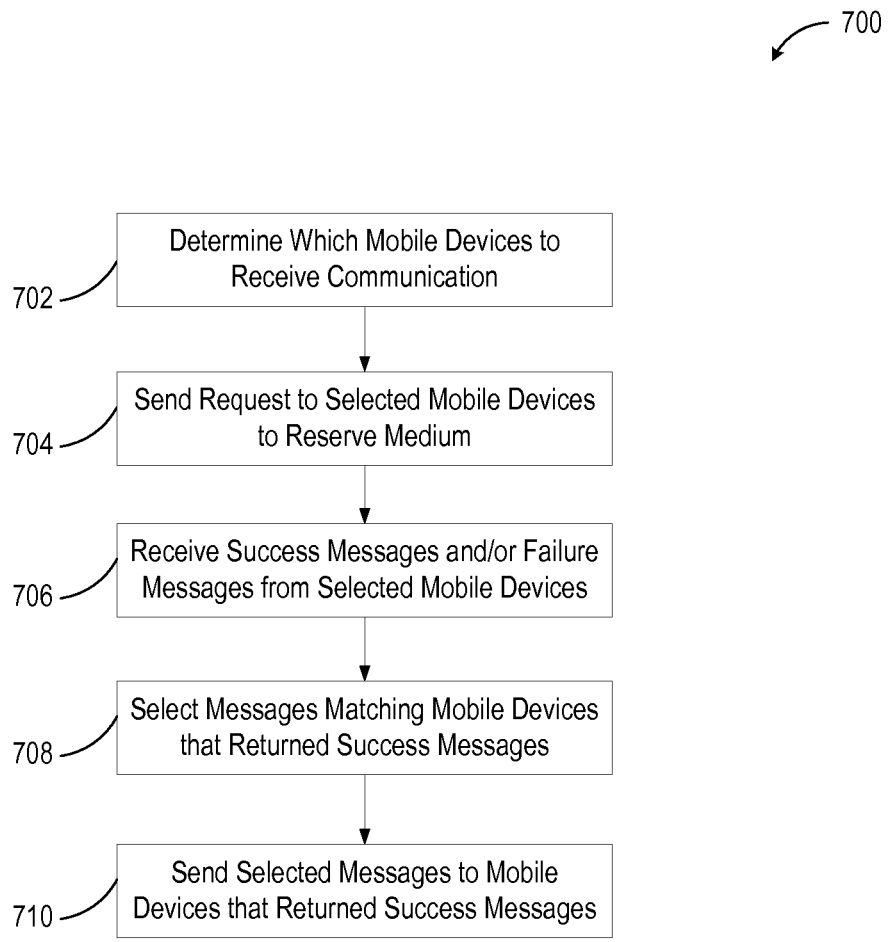
FIG. 7 is an example of a method for reserving spectrum from a tower perspective consistent with embodiments disclosed herein.

FIG. 7 is an example of a method 700 for reserving spectrum from a tower perspective consistent with embodiments disclosed herein. Process 700 can be accomplished by system 100 as shown in FIG. 1, including eNB 110; UEs 106a, 106b, 106c, 106d, 106e, 106f, 106g, 106h, 106i, 106j and 106k; WLAN APs 112a, 112b and 112c; and WLAN STAs 104a, 104b and 104c. In block 702, eNB 110 determines which mobile devices (e.g., UEs) will receive communication from eNB 110. In block 704, eNB 110 sends a request to selected mobile devices to reserve the medium (e.g., send a CTS message). In block 706, eNB 110 receives success messages and/or failure messages from the selected mobile devices indicating success or failure of reserving the medium. In block 708, eNB 110 selects messages (e.g., data) that match mobile devices that sent success messages. In block 710, eNB 110 sends selected messages to mobile devices that successfully reserved the medium.

Figure 8:
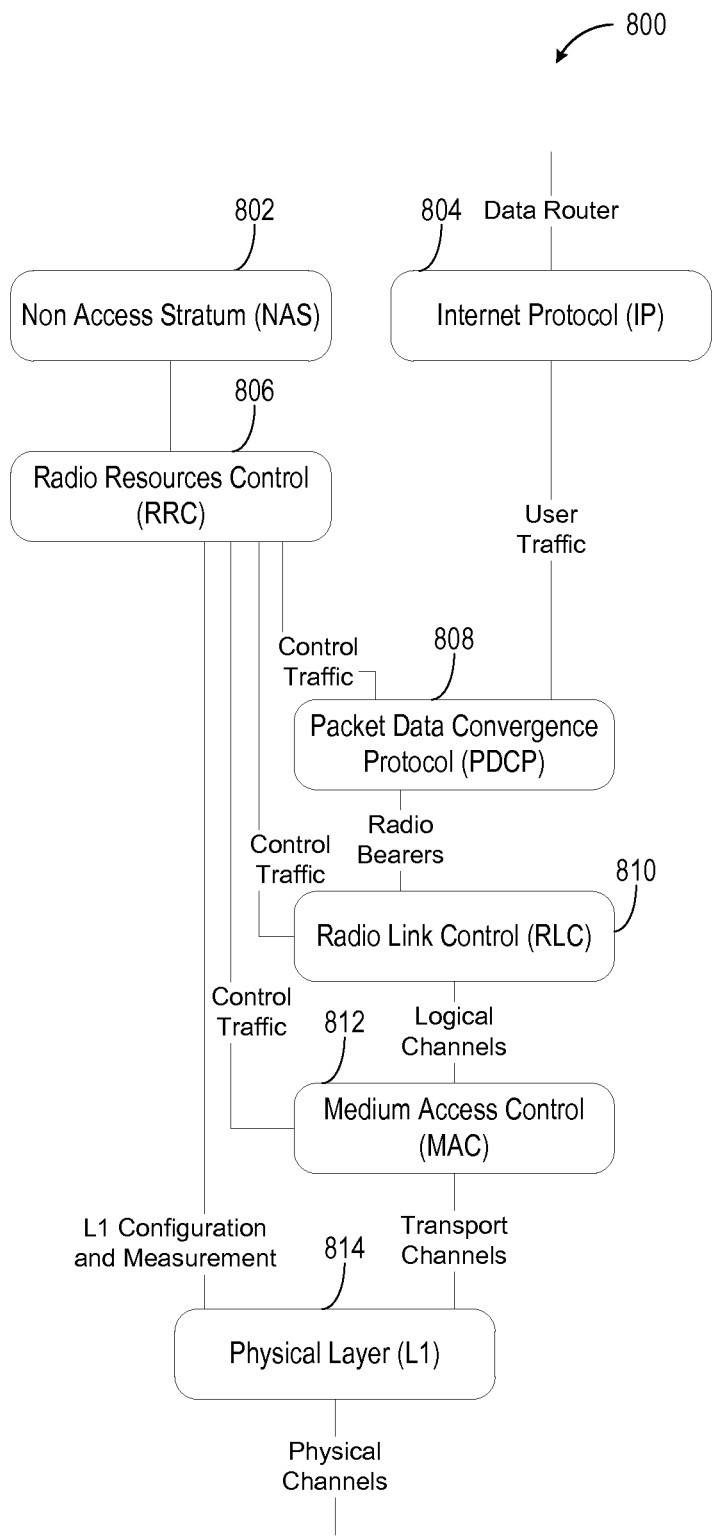
FIG. 8 is an example of a long term evolution stack that can be enhanced to reserve spectrum consistent with embodiments disclosed herein.

FIG. 8 is an example of an LTE stack that can be enhanced to reserve spectrum consistent with embodiments disclosed herein. Various embodiments described herein can also be used to expand, update, use and/or provide new functionality to existing wireless systems (e.g., RATs, RANs, UTRAN, EUTRAN, etc.). In FIG. 8, an example of an enhanced LTE protocol stack 800 for a UE is shown. The protocol stack 800 can be enhanced with new messages and measurements for use in connecting with small cells.

The stack describes protocol layers in an enhanced LTE protocol stack 800. These layers can provide abstraction from a lower layer (represented as a layer closer to the bottom of the page). A physical layer (L1) 814 includes systems that translate physical signals into logical data for use by the higher layers. L1 can also provide measurement and configuration services to the radio resource control (RRC) layer 806. The medium access control (MAC) layer 812 includes systems that perform transport as logical mapping and/or scheduling. MAC layer 812 includes systems that can provide format selection and measurements about the network to RRC layer 806. The radio link control (RLC) layer 810 includes systems that provide segmentation, concatenation and reassembly, and can operate in different modes depending on a radio bearer. The packet data convergence protocol (PDCP) layer 808 includes systems that can provide services for higher-level protocols including cryptographic functions, header compression/decompression, sequence numbering and/or duplicate removal. User traffic can be sent through PDCP layer 808 to the internet protocol (IP) layer 804, which is then routed to applications and systems of the UE for use. Control traffic can be sent to RRC layer 806. RRC layer 806 can provide management and control functions of the UE. RRC layer 806 functionality can include processing of broadcast information, paging, connection management with an eNB 110, integrity protection of RRC messages, radio bearer control, mobility functions, UE measurement and reporting, quality of service management, etc. The non access stratum (NAS) layer 802 includes systems that can provide mobility management, call control, session management and/or identity management.

In some embodiments, method 600 as described in conjunction with FIG. 6 can be implemented in L2, such as in RRC layer 806. For example, RRC layer 806 can perform operations 602 to 612.

A UE can perform medium sensing using energy detection (ED) or carrier sense (CS). Thresholds of ED and/or CS can be altered to facilitate medium sensing when WLAN and LAA coexist.

Figure 9:
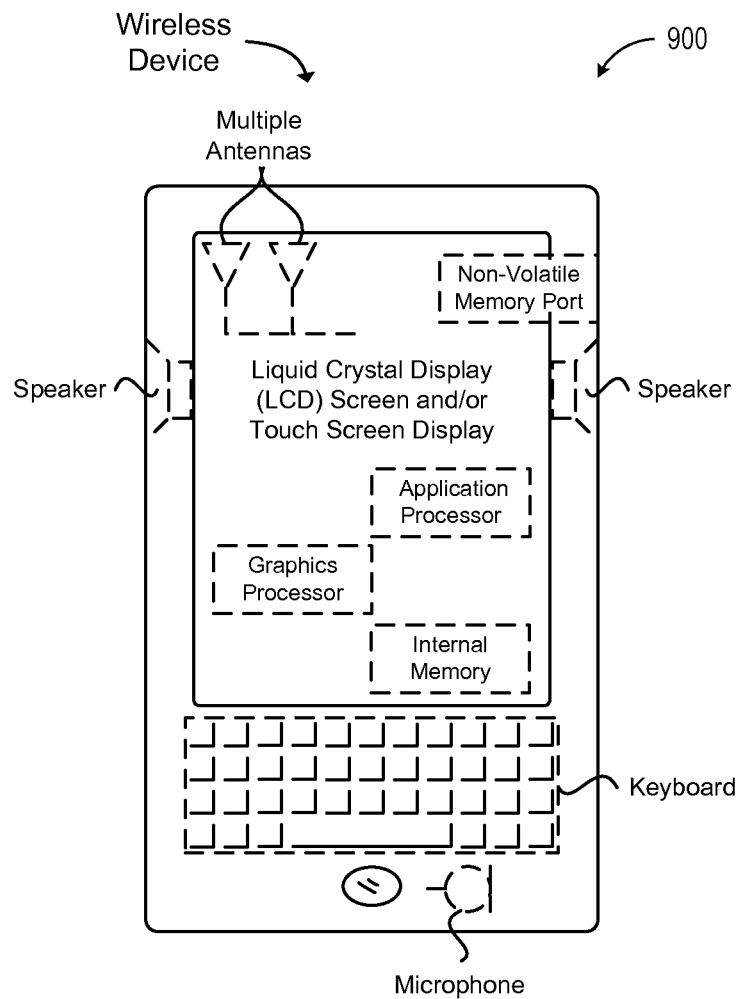
FIG. 9 is a diagram illustrating a mobile device consistent with embodiments disclosed herein.

FIG. 9 is an example illustration of a mobile device, such as a UE, a mobile station (MS), a mobile wireless device, a mobile communication device, a tablet, a handset, or another type of mobile wireless device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard including 3GPP LTE, WiMAX, HSPA, Bluetooth, and Wi-Fi. The mobile device can communicate using separate antennas for each wireless communication standard or shared antennas for multiple wireless communication standards. The mobile device can communicate in a WLAN, a wireless personal area network (WPAN), and/or a WWAN.

FIG. 9 also provides an illustration of a microphone and one or more speakers that can be used for audio input and output from the mobile device. The display screen can be a liquid crystal display (LCD) screen or other type of display screen, such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the mobile device. A keyboard can be integrated with the mobile device or wirelessly connected to the mobile device to provide additional user input. A virtual keyboard can also be provided using the touch screen.

EXAMPLES

The following examples pertain to further embodiments.

Example 1 is an evolved node B (eNB) for sharing unlicensed spectrum. The eNB includes a first wireless interface for communicating with cellular devices over a control channel. The eNB also includes a second wireless interface for communicating with the cellular devices over a communication channel on the unlicensed spectrum. The eNB further includes a processor. The processor is configured to select a set of cellular devices to receive a set of messages over the communication channel. The processor is also configured to transmit a request, using the control channel, to the set of cellular devices to broadcast a clear to send (CTS) message using a wireless local area network (WLAN) protocol. The processor is further configured to receive a report from a subset of the set of cellular devices documenting a successful broadcast of the CTS message and transmit, using a cellular protocol over the communication channel, a subset of the set of messages that are directed to the subset of the set of cellular devices.

In Example 2, the eNB of Example 1 can optionally have the control channel provided over licensed spectrum.

In Example 3, the eNB of Examples 1 can optionally have the control channel provided over the unlicensed spectrum.

In Example 4, the eNB in Examples 1-3 can optionally include the processor being further configured to buffer unsent messages from the set of messages for a next transmission attempt.

In Example 5, the eNB Examples 1-4 can optionally include the processor being further configured to determine that a successful report by a first cellular device from the set of cellular devices also applies to a second cellular device from the set of cellular devices based at least in part on a proximity of the first cellular device to the second cellular device.

In Example 6, eNB in Examples 1-5 can optionally include the processor being further configured to add the second cellular device to the subset of the set of cellular devices.

In Example 7 is a user equipment (UE) for coexisting with a wireless local area network (WLAN) protocol and a long term evolution over unlicensed spectrum (LTE-U) protocol. The UE includes a network controller. The network controller is configured to receive a request, using the LTE-U protocol, to reserve a medium used by the WLAN. The network controller is also configured to perform medium sensing to determine whether the medium is in use. When the medium is not in use, the network controller is also configured to transmit a medium reservation message using a WLAN protocol that indicates the medium is in use and send a success message indicating successful reservation of the medium.

In Example 8, the network controller of Example 7 can optionally be configured to, when the medium is in use, transmit a message indicating failure to reserve the medium.

In Example 9, the network controller of Examples 7-8 can optionally be configured to, when the medium is not in use, receive data through the LTE-U protocol.

In Example 10, the UE of Examples 7-9 can optionally be configured such that the medium reservation message is a CTS message.

In Example 11, the UE of Examples 7-10 can optionally be configured such that the request further includes a length of time to reserve the medium.

In Example 12, the UE of Examples 7-11 can optionally be configured such that performing medium sensing further comprises performing clear channel assessment (CCA).

In Example 13, the network controller of Examples 7-12 can optionally be configured to, when the medium is in use, determine a second medium reservation message was sent by a second UE proximate to the UE and send the success message indicating the successful reservation of the medium for the UE.

In Example 14 is a method of reserving a shared communication channel. The method includes receiving a request to broadcast a reservation message of a first protocol over a wireless band of frequencies shared with the first protocol and a second protocol. The method also includes reserving the wireless band of frequencies from use by the first protocol. The method further includes sending a successful reservation report indicating a successful reservation broadcast. The method also includes communicating, using the second protocol, within the wireless band of frequencies.

In Example 15, the method of Example 14 can optionally include performing sensing of the wireless band of frequencies to determine whether the wireless band of frequencies is in use, and broadcasting the reservation message using the first protocol.

In Example 16, the method of Examples 14-15 can optionally include determining an idle state exists for the first protocol over the wireless band of frequencies, and determining that an energy level present over the wireless band of frequencies is below a threshold.

In Example 17, the method of Example 14-16 can optionally include transmitting the request over a second wireless band of frequencies not shared with the first protocol and the second protocol.

In Example 18, the method of Examples 14-17 can optionally include determining that the successful reservation report represents a plurality of mobile devices based at least in part on location information of the plurality of mobile devices.

In Example 19, the method of Examples 14-18 can optionally be applied such that the first protocol is a non-third generation partnership project (3GPP) compatible protocol.

In Example 20, the method of Examples 14-19 can optionally be applied such that the the second protocol is a 3GPP compatible protocol.

In Example 21, the method of Examples 14-20 can optionally include transmitting using a duplex connection to the subset of the set of mobile devices using the second protocol.

In Example 22, the method of Examples 14-21 can optionally include transmitting using a downlink-only connection to the subset of the set of mobile devices using the second protocol.

Example 23 is a method of reserving a shared communication channel. The method includes determining a set of mobile devices to receive a set of communications over a wireless band of frequencies shared with a first protocol and a second protocol. The method also includes sending a request to the set of mobile devices to broadcast a reservation message using the first protocol. The method further includes receiving a successful reservation report from a subset of the set of mobile devices. The method also includes transmitting, using the second protocol, a subset of the set of communications that are directed to the subset of the set of mobile devices within the wireless band of frequencies.

In Example 24, the method of Examples 14-23 can optionally include one or more options. An option can include transmitting the request over a second wireless band of frequencies not shared with the first protocol and the second protocol. Another option can include determining that the successful reservation report from a mobile device represents a plurality of mobile devices based at least in part on location information of the plurality of mobile devices. Yet another option can include transmitting using a duplex connection to the subset of the set of mobile devices using the second protocol. Another option can include transmitting using a downlink-only connection to the subset of the set of mobile devices using the second protocol.

Example 25 is a method of reserving a shared communication channel. The method includes receiving a request to broadcast a reservation message of a first protocol over a wireless band of frequencies shared with the first protocol and a second protocol. The method also includes reserving the wireless band of frequencies from use by the first protocol. The method further includes sending a successful reservation report indicating a successful reservation broadcast. The method also includes communicating, using the second protocol, a set of data within the wireless band of frequencies.

In Example 26, the method of Examples 14-25 can optionally include one or more options. An option can include receiving the request over a second wireless band of frequencies not shared with the first protocol and the second protocol. Another option can include determining that the successful reservation report from a mobile device represents a plurality of mobile devices based at least in part on location information of the plurality of mobile devices. Yet another option can include transmitting using a duplex connection using the second protocol. Another option can include receiving using a downlink-only connection using the second protocol.

In Example 27, the method of Examples 14-26 can optionally be applied such that the first protocol is a non-third generation partnership project (3GPP) compatible protocol.

In Example 28, the method of Examples 14-27 can optionally be applied such that the second protocol is a third generation partnership project (3GPP) compatible protocol.

In Example 29, the method of Examples 25 can optionally be applied such that the first protocol is a non-third generation partnership project (3GPP) compatible protocol.

In Example 30, the method of Examples 25 can optionally be applied such that the second protocol is a third generation partnership project (3GPP) compatible protocol.

In Example 31, the method of Examples 14-30 can optionally be applied such that the third generation partnership project (3GPP) compatible protocol is licensed assisted access using LTE (LAA).

Example 32 is an apparatus including means to perform a method as described in Examples 14-31.

Example 33 is a machine readable storage including machine-readable instructions that when executed implement a method or realize an apparatus as claimed in any of Examples 14-31.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or internet or IP networks, such as the World Wide Web, a private internet, a secure internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general-purpose device, such as an Intel®, AMD®, or other "off-the-shelf" microprocessor. The processor may include a special-purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network.

The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. An evolved node B (eNB) for sharing unlicensed spectrum comprising:
   a first wireless interface for communicating with cellular devices over a control channel;
   a second wireless interface for communicating with the cellular devices over a communication channel on the unlicensed spectrum;
   a processor configured to:
      select a set of cellular devices to receive a set of messages over the communication channel, each cellular device corresponding to a least one message from the set of messages;
      transmit a request, using the control channel, to the set of cellular devices to broadcast a clear to send (CTS) message using a wireless local area network (WLAN) protocol;
      receive at least one first report from a first subset of the set of cellular devices documenting a successful broadcast of the CTS message;
      receive at least one second report from a second subset of the set of cellular devices documenting a failure to broadcast the CTS message;
      select a subset of the set of messages for transmission based at least in part on messages from the set of messages that correspond to the subset of the set of cellular devices documenting a successful broadcast of the CTS message; and
      transmit, using a cellular protocol over the communication channel, a subset of the set of messages based at least in part on the at least one first report and the at least one second report.

2. The eNB of claim 1, wherein the control channel is provided over licensed spectrum.

3. The eNB of claim 1, wherein the control channel is provided over the unlicensed spectrum.

4. The eNB of claim 1, wherein the processor is further configured to buffer unsent messages from the set of messages for a next transmission attempt.

5. The eNB of claim 1, wherein the processor is further configured to determine that a successful report by a first cellular device from the set of cellular devices also applies to a second cellular device from the set of cellular devices based at least in part on a proximity of the first cellular device to the second cellular device.

6. The eNB of claim 5, wherein the processor is further configured to add the second cellular device to the subset of the set of cellular devices.

7. A user equipment (UE) for coexisting with a wireless local area network (WLAN) protocol and a long term evolution over unlicensed spectrum (LTE-U) protocol comprising:
a network controller configured to:
receive a request, using the LTE-U protocol, to reserve a medium used by the WLAN based on the UE corresponding to a least one message from a set of messages for receipt by the UE;
perform medium sensing to determine whether the medium is in use; and
when the medium is not in use:
transmit a medium reservation message using a WLAN protocol that indicates the medium is in use;
send a success message indicating successful reservation of the medium, the success message indicating to a LTE-U RAN Node that the at least one message from the set of messages is to be sent to the UE in a transmission of a first subset of the set of messages, the first subset of the set of messages including the first subset of messages from the set of messages associated with a set of success messages and excluding a second subset of messages of the set of messages from the first subset of messages based at least in part on failure messages from UEs associated with the second subset of messages;
receive the at least one message from the set of messages based at least in part on the success message; and
when the medium is in use:
transmit a message indicating failure to reserve the medium.

8. The UE of claim 7, wherein the network controller is further configured to, when the medium is not in use, receive data through the LTE-U protocol.

9. The UE of claim 7, wherein the medium reservation message is a clear to send (CTS) message.

10. The UE of claim 7, wherein the request further includes a length of time to reserve the medium.

11. The UE of claim 7, wherein performing medium sensing further comprises performing clear channel assessment (CCA).

12. The UE of claim 7, wherein the network controller is further configured to, when the medium is in use, determine a second medium reservation message was sent by a second UE proximate to the UE and send the success message indicating the successful reservation of the medium for the UE.

13. A method of reserving a shared communication channel comprising:
receiving a request to broadcast a reservation message of a first protocol over a wireless band of frequencies shared with the first protocol and a second protocol, the request based at least in part on at least one message corresponding to a user equipment (UE) from a set of messages;
determining whether the wireless band of frequencies is in use by the first protocol;
determining that the wireless band of frequencies is not in use by the first protocol:
reserving the wireless band of frequencies from use by the first protocol;
sending a successful reservation report indicating a successful reservation broadcast, the successful reservation report indicating to a RAN Node that the at least one message from the set of messages is to be sent to the UE in a transmission of a first subset of the set of messages, the first subset of the set of messages including the first subset of messages from the set of messages associated with a set of successful reservation reports and excluding a second subset of messages of the set of messages from the first subset of messages based at least in part on unsuccessful reservation reports from UEs associated with the second subset of messages; and
communicating, using the second protocol, within the wireless band of frequencies.

14. The method of claim 13, wherein determining
whether the wireless band of frequencies is in use by the first protocol further comprises:
performing sensing of the wireless band of frequencies to determine whether the wireless band of frequencies is in use; and
broadcasting the reservation message using the first protocol.

15. The method of claim 14, wherein performing sensing of the wireless band of frequencies further comprises:
determining an idle state exists for the first protocol over the wireless band of frequencies; and
determining that an energy level present over the wireless band of frequencies is below a threshold.

16. The method of claim 13, wherein receiving the request further comprises receiving the request over a second wireless band of frequencies not shared with the first protocol and the second protocol.

17. The method of claim 13, further comprising determining that the successful reservation report represents a plurality of mobile devices based at least in part on location information of the plurality of mobile devices.

18. The method of claim 13, wherein the first protocol is a non-third generation partnership project (non-3GPP) compatible protocol.

19. The method of claim 13, wherein the second protocol is a third generation partnership project (3GPP) compatible protocol.

20. The method of claim 13, wherein communicating, using the second protocol, within the wireless band of frequencies further comprises transmitting using a duplex connection to the subset of the set of mobile devices using the second protocol.

21. The method of claim 13, wherein communicating, using the second protocol, within the wireless band of frequencies further comprises transmitting using a downlink-only connection to the subset of the set of mobile devices using the second protocol.

* * * * *